United States Patent
Zhu

(10) Patent No.: US 11,345,359 B2
(45) Date of Patent: May 31, 2022

(54) AUTONOMOUS DRIVING VEHICLES WITH DUAL AUTONOMOUS DRIVING SYSTEMS FOR SAFETY

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 200 days.

(21) Appl. No.: 16/711,649

(22) Filed: Dec. 12, 2019

(65) Prior Publication Data

US 2021/0179122 A1   Jun. 17, 2021

(51) Int. Cl.
| | |
|---|---|
| *B60W 50/02* | (2012.01) |
| *B60R 16/023* | (2006.01) |
| *G05D 1/02* | (2020.01) |
| *G05D 1/00* | (2006.01) |
| *B60W 10/18* | (2012.01) |

(52) U.S. Cl.
CPC ..... *B60W 50/0225* (2013.01); *B60R 16/0232* (2013.01); *B60W 10/18* (2013.01); *B60W 50/0205* (2013.01); *G05D 1/0088* (2013.01); *G05D 1/0214* (2013.01); *G05D 2201/0213* (2013.01)

(58) Field of Classification Search
CPC ......... B60W 50/0225; B60W 50/0205; B60W 10/18; B60R 16/0232; G05D 1/0214; G05D 1/0088; G05D 2201/0213; G05B 23/0213

See application file for complete search history.

(56) References Cited

U.S. PATENT DOCUMENTS

2019/0369635 A1\* 12/2019 Kobayashi ........ B60W 60/0059

FOREIGN PATENT DOCUMENTS

| CN | 109917779 A | \* | 6/2019 |
| JP | 2019111866 A | \* | 7/2019 |

\* cited by examiner

*Primary Examiner* — Marthe Y Marc-Coleman

(74) *Attorney, Agent, or Firm* — Womble Bond Dickinson (US) LLP

(57) ABSTRACT

According to one embodiment, a first autonomous driving system (e.g., main system) is configured to perform a planning and control operation on an ADV, including perceiving a driving environment surrounding the ADV and planning a trajectory to drive the ADV. A second autonomous driving system (e.g., a backup system) operates as a redundant driving system to monitor a first operating status of the first autonomous driving system. The first autonomous driving system further monitors a second operating status of the second autonomous driving system. A safety action is performed to transition the ADV into a safer state based on the monitored operating status of the first and second autonomous driving systems.

20 Claims, 8 Drawing Sheets

AUTONOMOUS DRIVING VEHICLES WITH DUAL AUTONOMOUS DRIVING SYSTEMS FOR SAFETY

TECHNICAL FIELD

Embodiments of the present disclosure relate generally to operating autonomous vehicles. More particularly, embodiments of the disclosure relate to autonomous driving vehicles with dual driving systems for safety.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Safety is an important concern for an autonomous driving vehicle (ADV). Since an ADV is driven by a computer system, failure of any component of an autonomous driving system may leads to an accident and the ADV is required to be positioned in a safe position. There has been a lack of efficient mechanism to monitor the operations of the autonomous driving system and to put the vehicle in a safety state.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
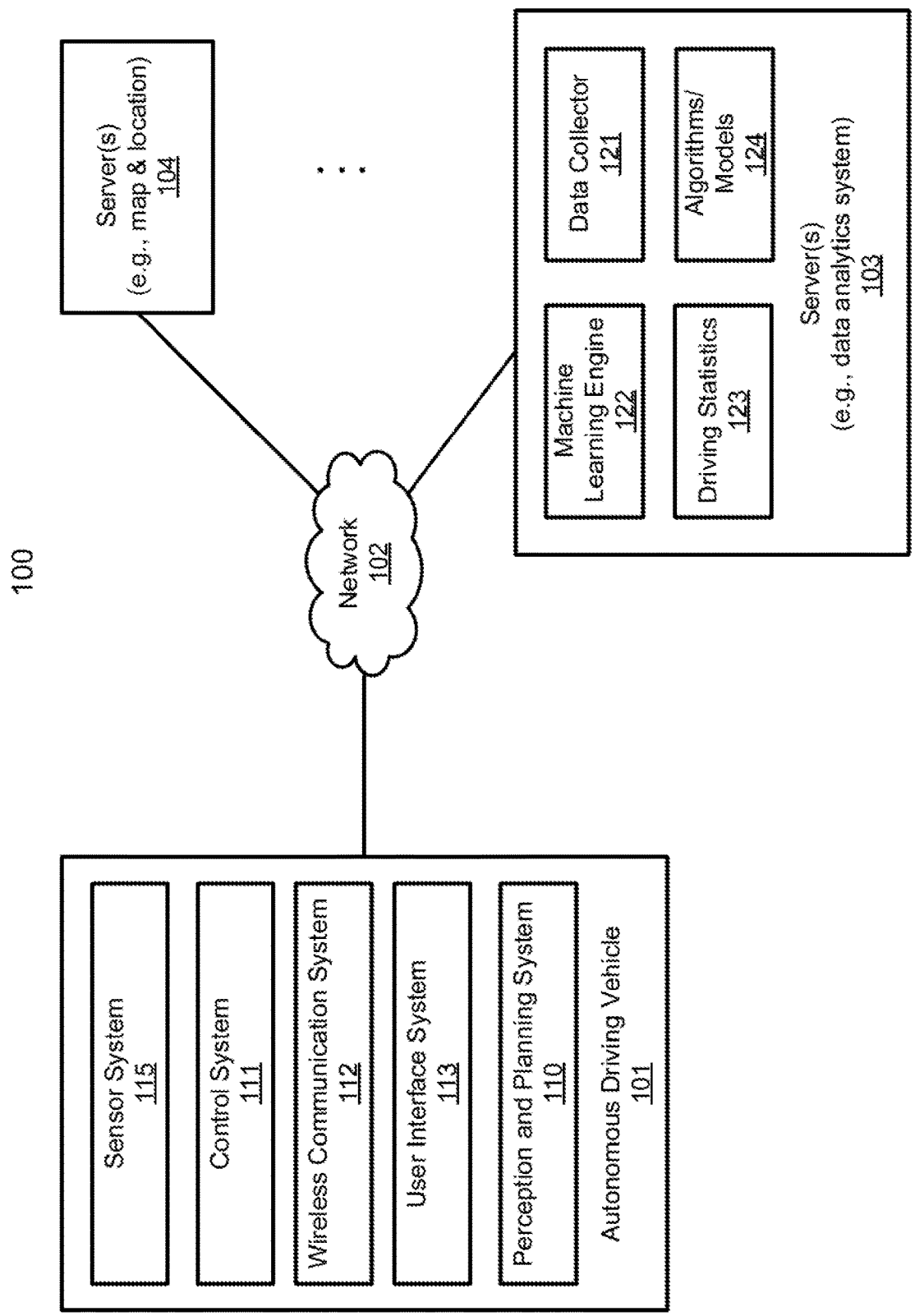
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a monitoring and fault handling system is utilized to monitor an autonomous driving system and to put the ADV into a safety state in response to a signal indicating at least one of the autonomous driving component fails to function. There are two autonomous driving systems on an ADV: a main system and a backup system. The main system is to operate a regular system that is responsible to handle regular daily autonomous driving operations including perception, planning and control operations. The backup system is configured to perform a backup operation in response to detecting a failure of at least one components of the main system and to put the ADV in a safety state. The main system and the backup system are configured to monitor each other's operating status, and based on the operating status of the main system and the backup system, a failure of the main system may be detected and the ADV transitions to a safer state in response.

According to one aspect, a first autonomous driving system (e.g., main system) is configured to perform a planning and control operation on an ADV, including perceiving a driving environment surrounding the ADV and planning a trajectory to drive the ADV. A second autonomous driving system (e.g., a backup system) operates as a redundant driving system to monitor a first operating status of the first autonomous driving system. The first autonomous driving system further monitors a second operating status of the second autonomous driving system. A safety action is performed to transition the ADV into a safer state based on the monitored operating status of the first and second autonomous driving systems.

In one embodiment, the first system performs a self-diagnosis on operations of the first system and the second system performs a self-diagnosis on operations of the second system. The safety action is performed based on the self-diagnosis provided by the first and second autonomous driving systems. In addition, the first and second systems have exchange their operating status and/or self-diagnosis to allow the counterpart system to determine whether the other counterpart system operates properly. In one embodiment, the first and second systems are coupled to a local network such as a local wireless network. At least some of the modules of each of the first and second systems may broadcast or multicast messages concerning their respective operations in the network. Other modules and/or the other system may subscribe or listen to the broadcast to receive the information for the purpose of determining whether the other system operates properly.

In one embodiment, the first system sends the operating status of the second system and the its self-diagnosis to an electronic control unit (ECU) of the vehicle. Similarly, the second system sends the operating status of the first system and its own self-diagnosis to the ECU, for example, over a vehicle bus. Based on the information received from the first and second systems, the ECU may determine whether any one of the first and second systems operates properly. An operating status may include information indicating the resource usage level (e.g., processor usage level) of an autonomous driving system or whether the system operates according to a predetermined schedule (e.g., 10 Hz driving cycle). In response to determining that one or more components of the first and/or second systems fails to function, the ECU may generate a control comment to the vehicle to transition the vehicle to a safety state.

In one embodiment, when the first system sends a first control command (e.g., a first brake command) to the ECU and the second system sends a second control command (e.g., a second control command) to the ECU, based on the operating status and/or self-diagnosis information received from the first and second systems, the ECU may generate a third control command based on the first and second control commands (e.g., a first control command or second control command whichever larger). In one embodiment, the third control command is issued in response to determining that the operating status and/or self-diagnosis of the first and second autonomous driving systems indicate that the first and second systems function properly. On the other hand, if it is determined that any of the first and second systems fails to function properly based on their respective operating status and/or self-diagnosis, the ECU may issue a predetermined fourth command such as a hash or maximum brake command to put the vehicle in a stop or rapid slow-down state.

According to another aspect, an electronic control unit (ECU) of the ADV receives a second operating status of a second autonomous driving system and a first control command from a first autonomous driving system. The ECU receives a first operating status of the first autonomous driving system and a second control command from the second autonomous driving system. The first autonomous driving system is a main system to autonomous drive the ADV and the second autonomous driving system is a backup system of the main system. The ECU determines whether the first autonomous driving system operates normally based on at least one of the first operating status or the second operating status. The ECU executes at least one of the first control command or the second control command, in response determining that the first autonomous driving system operates normally. A predetermined action is performed to transition the ADV to a predetermined safety state, in response to determining that the first autonomous driving system operates abnormally.

In one embodiment, one of the first control command and the second control command is selected for execution, in response to determining that the first autonomous driving system operates normally. On the other hand, in response to determining that the first autonomous driving system fails to operate normally, a predetermined safety action will be performed. For example, a maximum brake command (e.g., 100% brake command) is issued to the vehicle to stop or rapidly slow down the vehicle.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
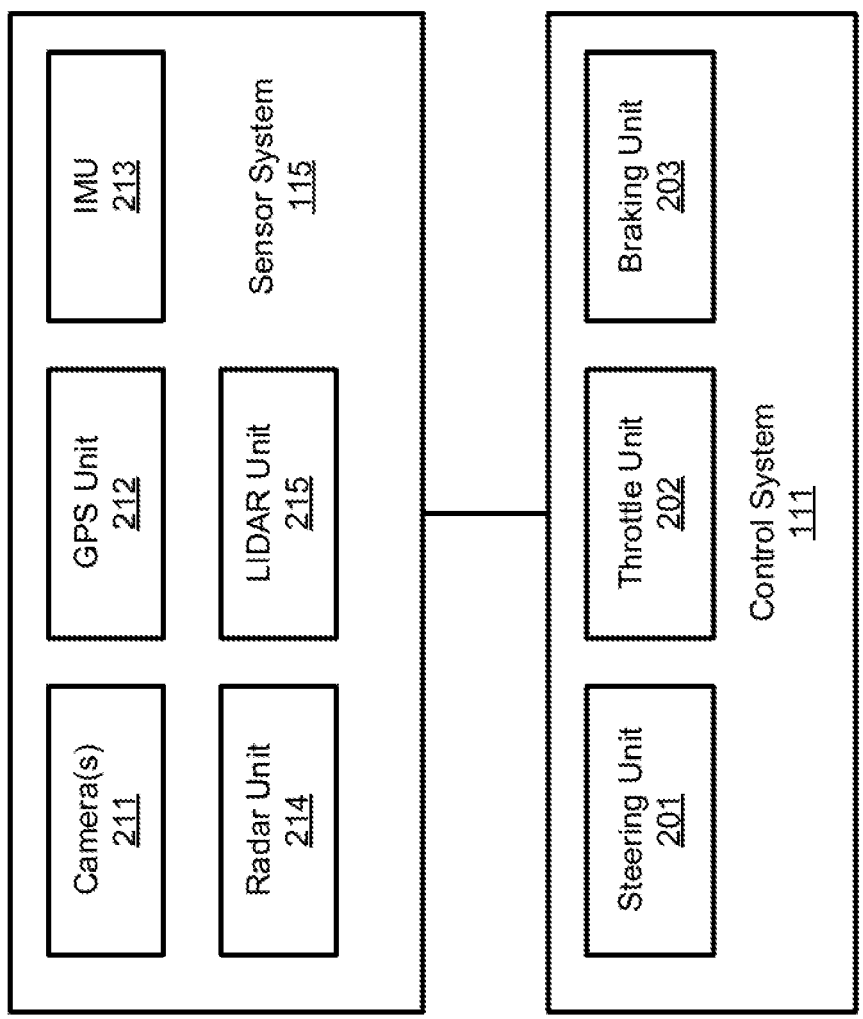
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In one embodiment, system 110 includes a main autonomous driving system and a backup autonomous driving system coupled to each other for safety monitoring and actions, which will be described in details further below.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include the algorithms to monitor, examine, and determine operating status of an autonomous driving system, as well as an algorithm to conduct a self-diagnosis examination of an autonomous driving system. Algorithms 124 can then be uploaded on ADVs to be utilized during autonomous driving in real-time.

Figure 3A:
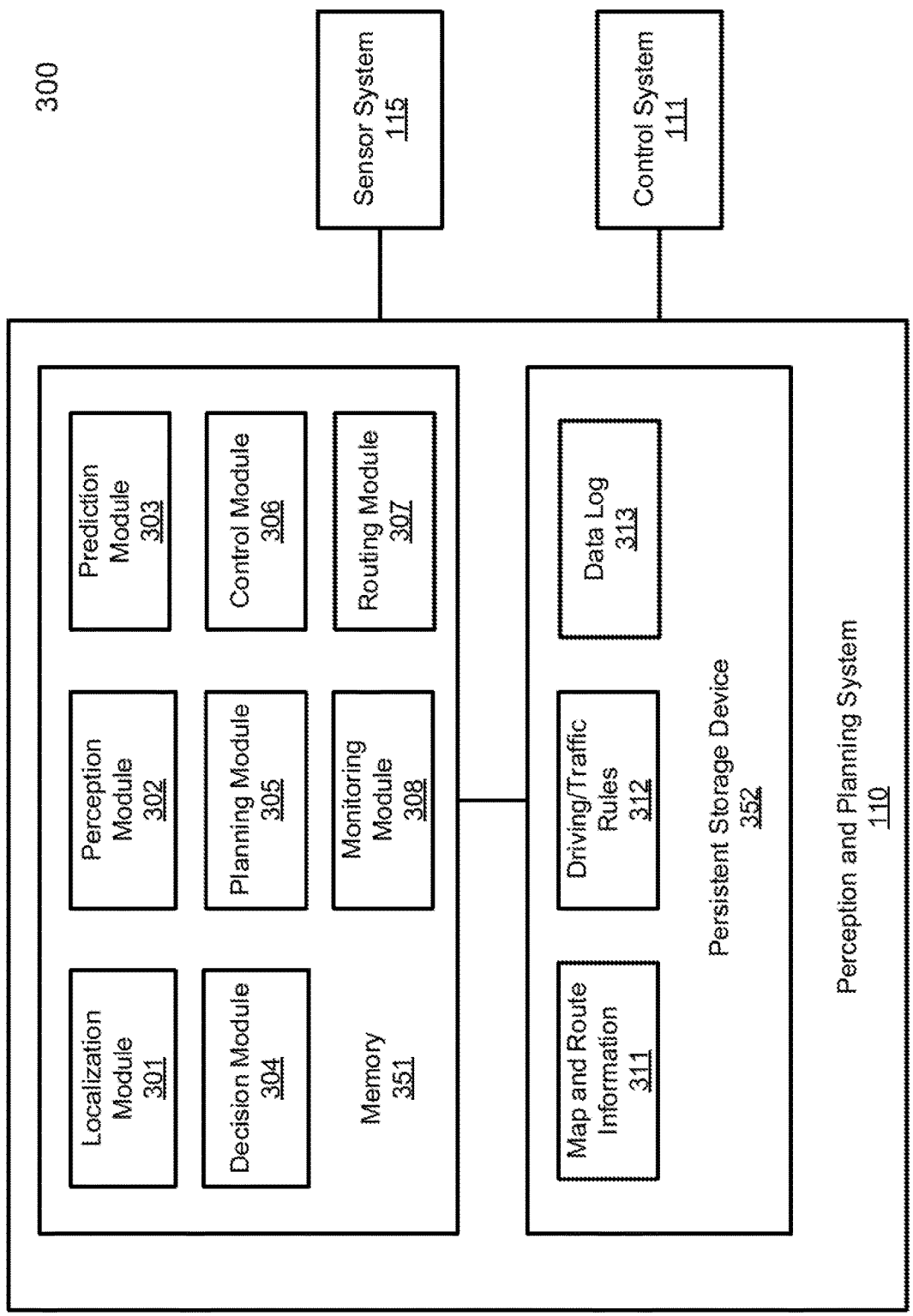
FIGS. 3A-3B are block diagrams illustrating an example of a perception and planning system used with an autonomous vehicle according to one embodiment.
Figure 3B:
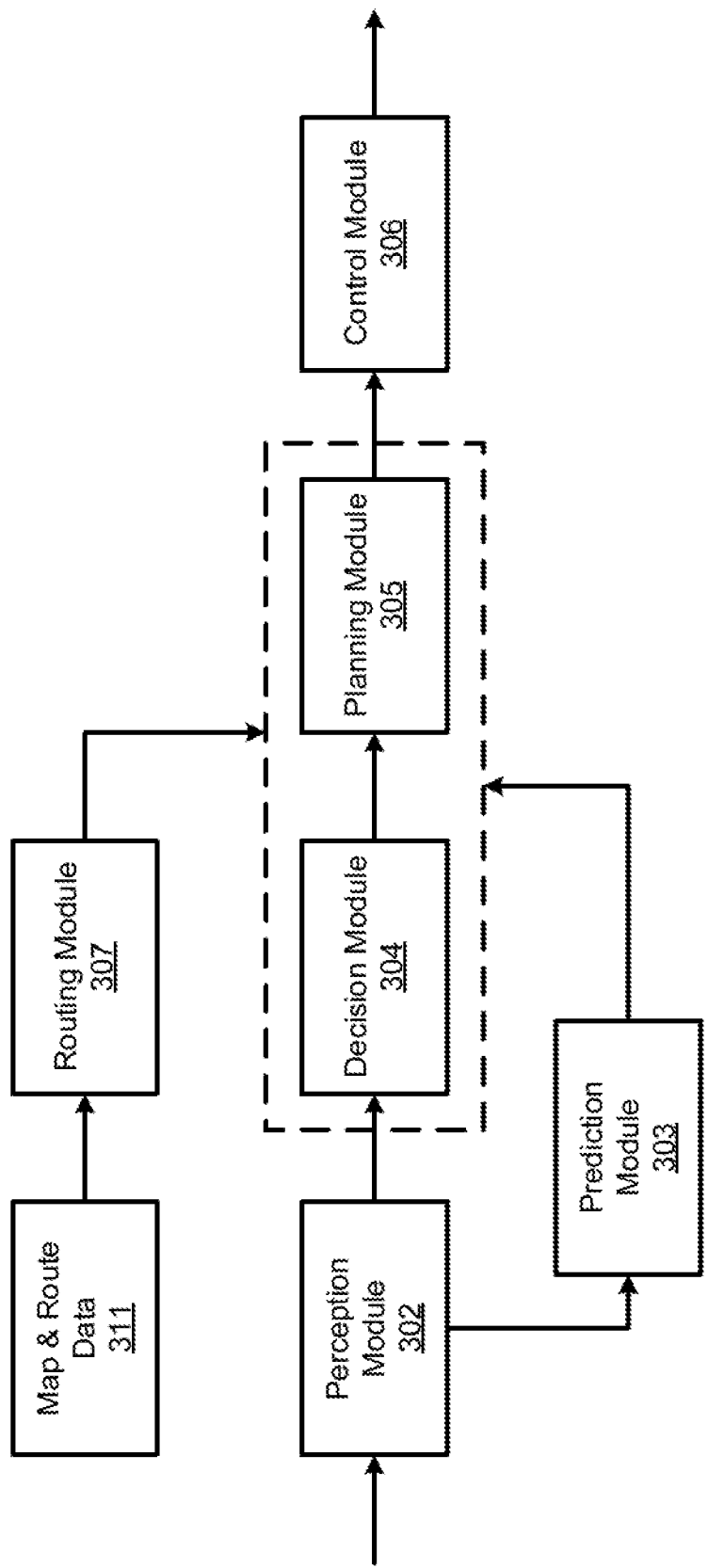

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and monitoring module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, monitoring module 308 is configured to monitor its own operating status of the autonomous driving system, including collecting the operational data or status of various modules 301-307. In addition, monitoring 308 further communicates with a counterpart modules of a counterpart autonomous driving system (e.g., main autonomous driving system or backup autonomous driving system, or vice versa). The operational data may be stored as part of data log 313 stored in persistent storage device 352, which may be analyzed subsequently. Monitoring module 308 may further transmit the operational data to an ECU of the vehicle (not shown) to allow the ECU to perform the necessary actions based on the operational data, such as, for example, issuing one or more control commands (e.g., brake commands) to transition the vehicle to a predetermined safety state (e.g., stop, or rapid deceleration).

Figure 4:
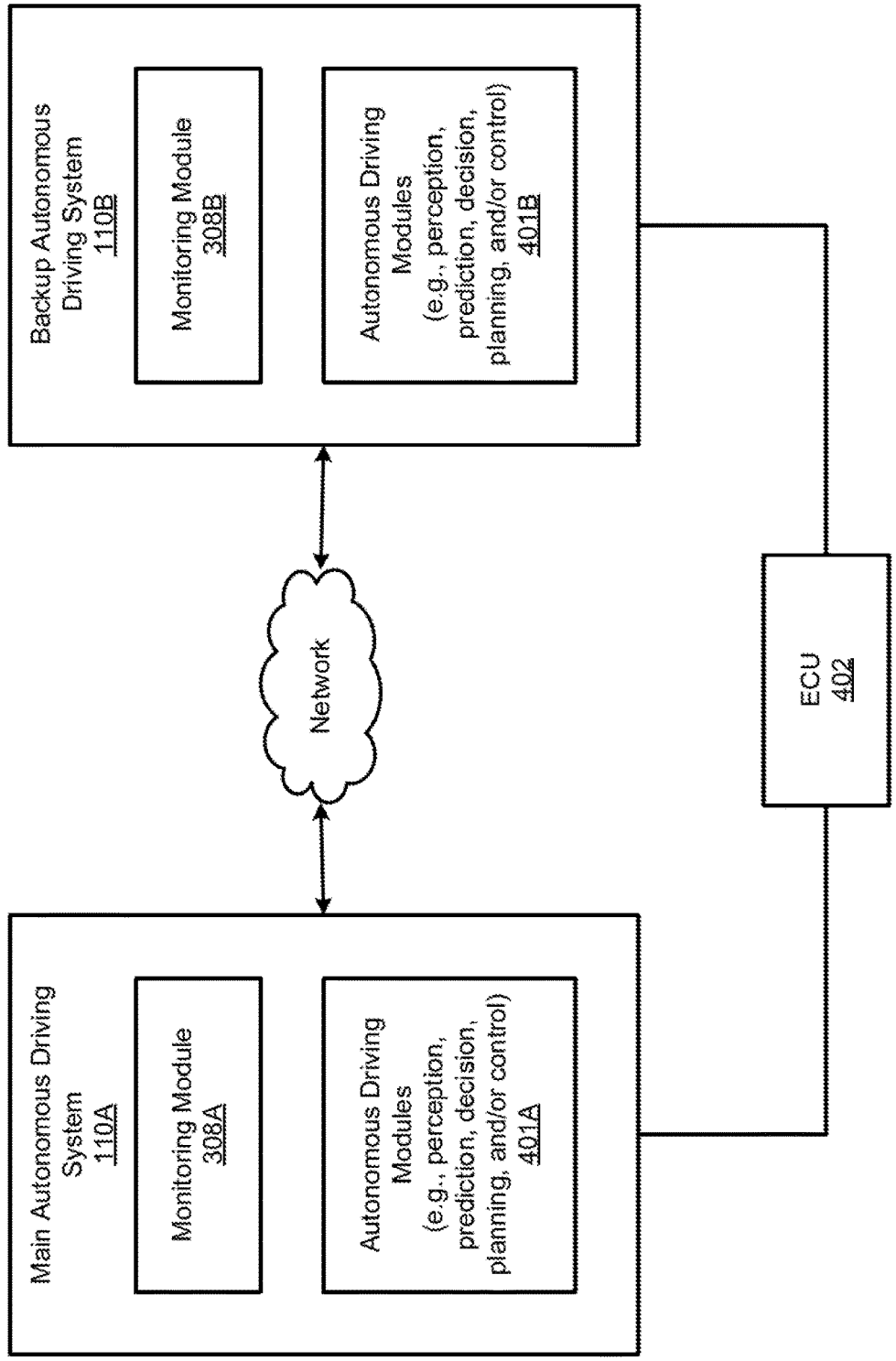
FIG. 4 is a block diagram illustrating an example of an autonomous driving system according to one embodiment.

FIG. 4 is a block diagram illustrating an example of an autonomous driving vehicle according to one embodiment. For example, ADV 400 may present ADV 101 of FIG. 1. Referring to FIG. 4, in this example, ADV 400 includes a main autonomous driving system 110A and a backup or redundant autonomous driving system 110B. Main system 110A includes monitoring module 308A and autonomous driving modules 401A. Similarly, backup system 110B includes monitoring module 308B and autonomous driving modules 401B. Autonomous driving modules 401A and 401B include modules similar those modules as shown in FIG. 3A. In one embodiment, main autonomous driving system 110A is responsible for driving ADV 400 include the autonomous driving operations as described above with respect to FIGS. 3A and 3B.

Backup autonomous driving system 110B is configured to be a standby or redundant autonomous driving system. Backup system 401B may take over the control of the ADV 400 in response to determining that at least one of the modules 401A of main system 110A fails to function according to a predetermined specification. In such a situation, backup system 110B may send an instruction or command to ECU 402 requesting ECU 402 to transition ADV 400 into a safety state. Autonomous driving modules 401B may be configured to perform operations similar to modules 401A during the autonomous driving of ADV 400, but are not as comprehensive as modules 401A. For example, a perception module of backup system 110B may only need to determine the driving environment in front of the vehicle. Backup system 110B may perform fewer functionalities or issue fewer types of control commands than main system 110A. For example, backup system 110B may only issue brake commands, which typically puts the vehicle in a safer state such as a stop or rapid deceleration state.

An ECU is any embedded system in automotive electronics that controls one or more of the electrical systems or subsystems in a vehicle. Types of ECU include Engine Control Module (ECM), Powertrain Control Module (PCM), Transmission Control Module (TCM), Brake Control Module (BCM or EBCM), Central Control Module (CCM), Central Timing Module (CTM), General Electronic Module (GEM). Body Control Module (BCM). Suspension Control Module (SCM), control unit, or control nodule.

Figure 5:
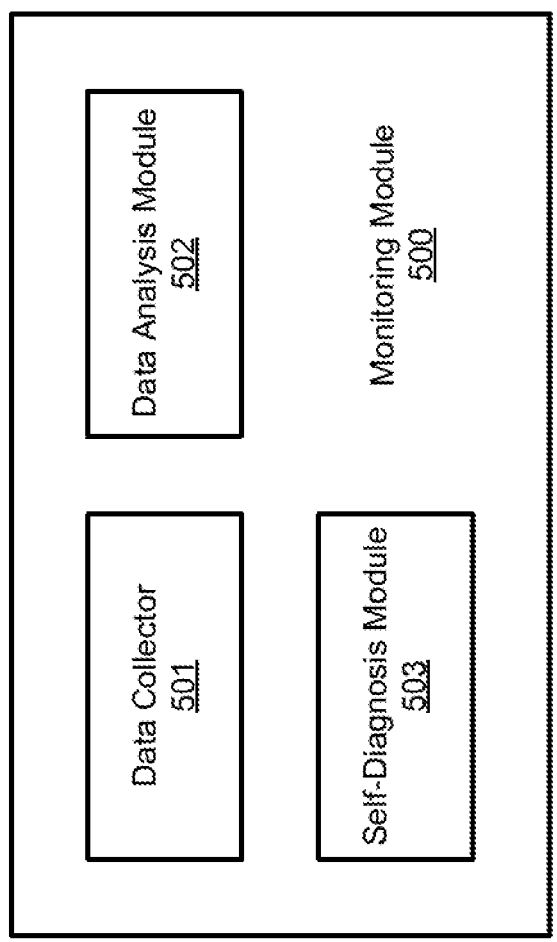
FIG. 5 is a block diagram illustrating an example of a monitoring module according to one embodiment.

FIG. 5 is a block diagram illustrating an example of a monitoring module according to one embodiment. Monitoring module 500 may represent any of monitoring modules 308A-308B. Referring to FIG. 5, monitoring module 500 includes, but is not limited to, data collector 501, data analysis module 502, and self-diagnosis module 503. Data collector 501 is configured to subscribe or listen to collect the messages or information transmitted or broadcast by autonomous driving modules 401A-401B. As described above, the autonomous driving module 401A-401B may be executed by one or more processors of one or more computers and coupled to a network. When a module generates data, the module may broadcast the data in the network. Other modules can subscribe or listen to network traffic and receive the information. For example, when a perception module generate the perception data, it may broadcast a message in the network so that other modules, such as, a prediction module, planning module, and/or control module, may receive the notification and access the perception data (which may be stored in the memory or a persistent storage device). Similarly, a monitoring module may also receive such messages and access the same data.

Once the data has been collected, data analysis module 502 is configured to perform a data analysis on the data and to generate or compile operational data representing the operating status about the corresponding autonomous driving system. In addition, self-diagnosis module 503 is configured to perform a self-diagnosis on the operations of its own autonomous driving system. For example, as described above, each of the modules operates according to a driving cycle such as 10 Hz or every 100 ms. Thus, each module may broadcast a message every 100 ms. Based on this, monitoring module can determine whether a particular module operates properly by monitoring the frequency of the broadcast messages. Alternatively, based on the process usage, the monitoring module can also estimate whether the autonomous driving system operate properly. The rationale behind this is that when an autonomous driving system operate properly, the processor usage should be maintained above certain threshold.

Referring to FIGS. 4 and 5, according to one embodiment, main system 110A sends at least one set of information to ECU 402: 1) operating status of backup system 110B or 2) self-diagnosis of its own system 110A. Similarly, backup system 110B sends at least one set of information to ECU 402: 1) operating status of main system 110A or 2) self-diagnosis of its own system 110B. Based on the information received from main system 110A and backup system 110B, ECU 402 is configured to perform either a normal action to autonomously drive the vehicle or a safety action to put the vehicle in a safety state.

In one embodiment, ECU 402 determines whether any of the components of main system 110A fails to satisfy a predetermined condition based on the operating status and/or self-diagnosis of main system 110A. Similarly, ECU 402 determines whether any of the component of the backup system 110B based on the operating status and/or self-diagnosis of the backup system 110B. If both system 110A and 110B are determined to operate properly, ECU 402 is configured to perform normal autonomous actions. On the other hand, if it is determined that any of the components of any of systems 110A and 110B fails to operate according to a predetermined specification, ECU 402 may activate a predetermined action to put the vehicle in a safety state.

From the point of view with respect to ECU 402, operating status of systems 110A and 110B is more reliable information compared to the self-diagnosis information. ECU 402 may determine the final operating condition of the main system 110A and backup system 110B by applying different weights when considering the operating status and the self-diagnosis information.

As described above, typically in order to control ADV 400, main system 110A and/or backup system 110B have to send control commands to ECU 402, which in turns interprets the commands and generates control signals to control the ADV 400. Thus during the autonomous driving, main system 401A sends control commands to ECU 402 such as throttle commands, brake commands, or steering commands. During normal driving, backup system 110B operates in a standby mode and typically does not send any control command to ECU 402. However, when backup system 110B detects that main system 110A fails to operate in a normal manner based on the monitored operating status of the main system 110A, backup system 110B may send a command to ECU, such as, for example, a brake command, in an attempt to put the vehicle in a safety state.

In one embodiment, when ECU 402 receives two commands from main system 110A and backup system 110B respectively, ECU 402 examines the operating status of the main system 110A and backup system 110B, and/or self-diagnosis of both main system 110A and backup system 110B. If the operating status indicates that both system 110A and 110B operate properly, ECU 402 may execute the commands received from both system 110A and 110B. If both commands are the same type of commands, such as, for example, brake commands, ECU 402 may select one of them to execute. For example, ECU 402 may select a bigger command to execute.

On the other hand, if it is detected that one of the main system 110A and backup system 110B fails to function properly, ECU may ignore the commands received from either system. Instead, ECU 402 may execute or issue a predetermined command such as a maximum brake command to put the vehicle in the safety condition.

Figure 6:
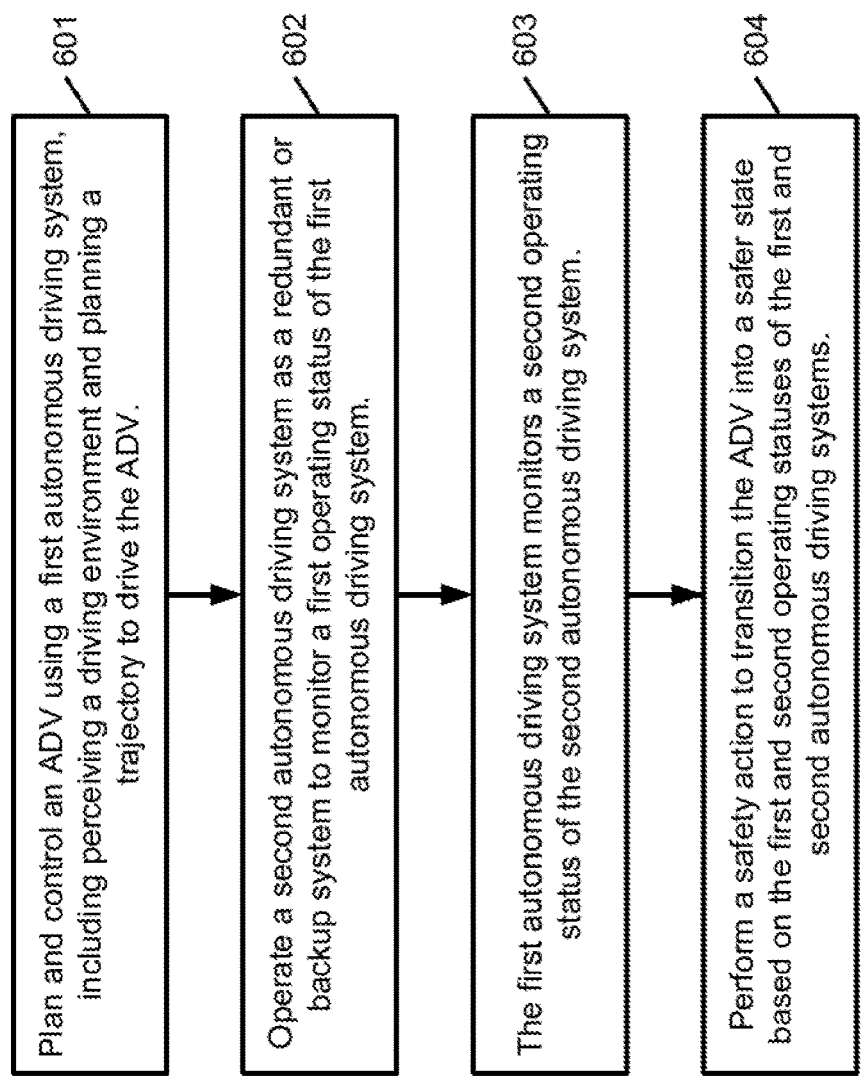
FIG. 6 is a flow diagram illustrating an example of a process of operating an autonomous driving vehicle according to one embodiment.

FIG. 6 is a flow diagram illustrating an example of a process of operating an autonomous driving vehicle according to one embodiment. Process 600 may be performed by processing logic which may include software, hardware, or a combination thereof. For example, process 600 may be performed by main system 110A and/or backup system 110B. Referring to FIG. 6, at block 601, processing logic performs planning and controlling an ADV using a first autonomous driving system (e.g., main autonomous driving system), including perceiving a driving environment surrounding the ADV and planning a trajectory to drive the ADV. At block 602, a second autonomous driving system operates as a backup or redundant driving system to monitor a first operating status of the first autonomous driving system. At block 603, the first autonomous driving system monitors a second operating status of the second autonomous driving system. At block 604, the first and second autonomous driving systems perform a self-diagnosis analysis respectively. At block 605, a safety action is performed to transition the ADV to a safety state based on the operating status and/or self-diagnosis of the first and second autonomous driving systems. A safety action can be issuing a maximum brake command to the vehicle to rapidly decelerate or stop the vehicle.

Figure 7:
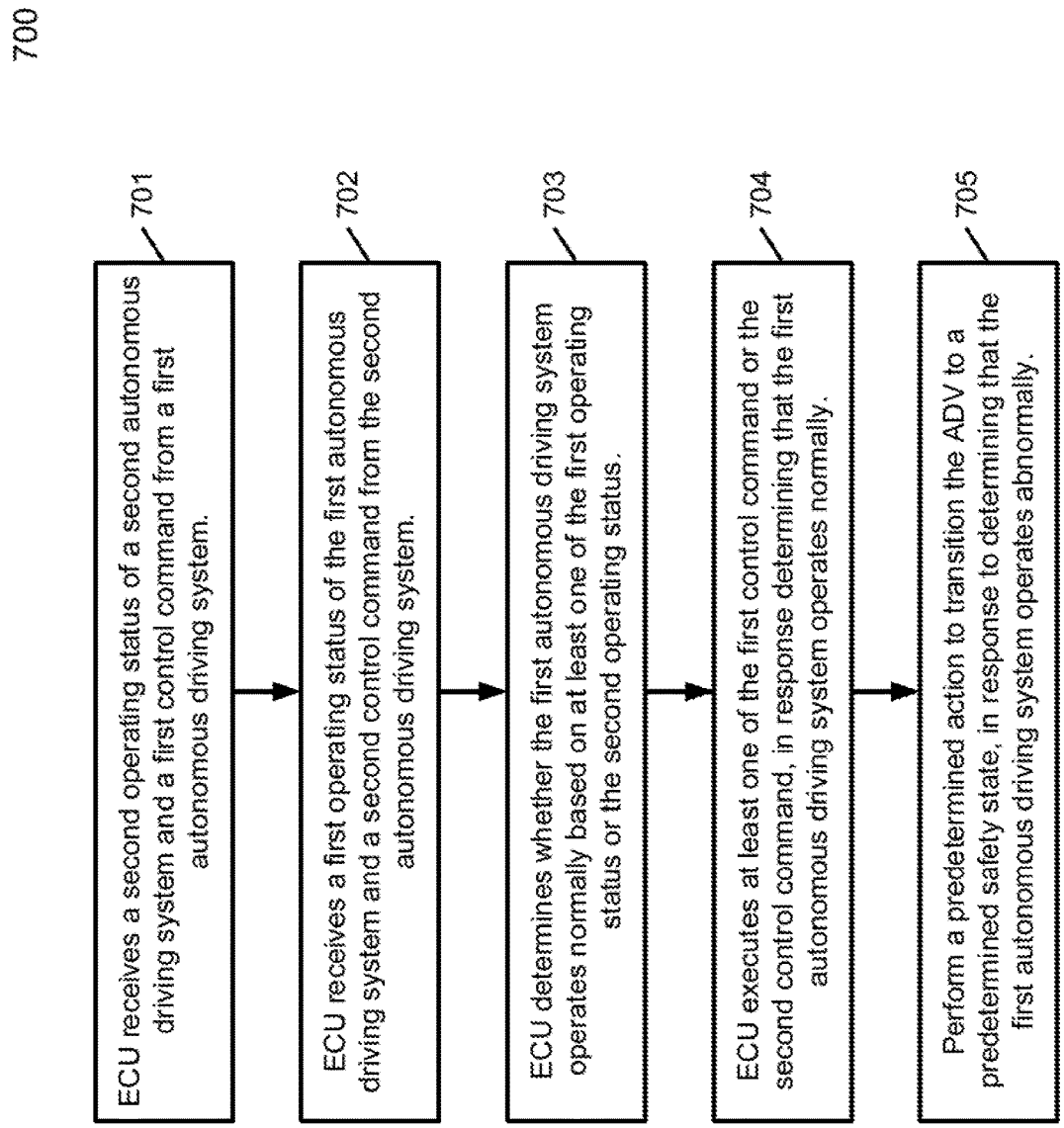
FIG. 7 is a flow diagram illustrating an example of a process of operating an autonomous driving vehicle according to another embodiment.

FIG. 7 is a flow diagram illustrating a process of operating an autonomous driving vehicle according to another embodiment. Process 700 may be performed by ECU 402. Referring to FIG. 7, at block 701, the ECU receives from a first autonomous driving system (e.g., main system) second operational data concerning a second autonomous driving system (e.g., backup or redundant system), first self-diagnosis information of the first autonomous driving system, and a first control command. At block 702, the ECU receives from the second autonomous system first operational data concerning the first autonomous driving system, second self-diagnosis of the second autonomous system, and a second command. At block 703, ECU determines whether the first and/or second autonomous driving system fail to function properly based on the first and second operational data and the first and second diagnosis information. If it is determined that at least the first autonomous driving system operates normally, at block 704, the ECU performs an action based on at least one of the first and second commands. For example, if both commands are brake commands, the ECU performs the action based on one of the brake commands, whichever larger. If it is determined that at least the first autonomous driving system fails to operate properly, at block 705, the ECU performs a predetermined safety action, such as, issuing a maximum brake command.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   planning and controlling the ADV using a first autonomous driving system, including perceiving a driving environment surrounding the ADV and planning a trajectory to drive the ADV;
   operating a second autonomous driving system as a redundant driving system to monitor a first operating status of the first autonomous driving system;
   monitoring, by the first autonomous driving system, a second operating status of the second autonomous driving system, the monitoring including collecting operational data representing the first operating status of the first autonomous driving system and the second operating status of the second autonomous driving system stored as a data log; and
   performing a safety action to transition the ADV into a safer state based on the first and second operating statuses of the first and second autonomous driving systems.

2. The method of claim 1, further comprising:
   performing, by the first autonomous driving system, a first self-diagnosis on operations of the first autonomous driving system; and
   performing, by the second autonomous driving system, a second self-diagnosis on operations of the second autonomous driving system.

3. The method of claim 2, wherein the safety action is performed further based on the first self-diagnosis provided by the first autonomous driving system and the second self-diagnosis provided by the second autonomous driving system.

4. The method of claim 2, further comprising:
   transmitting by the first autonomous driving system the second operating status to an electronic control unit (ECU) of the ADV; and
   transmitting by the second autonomous driving system the first operating status to the ECU of the ADV, wherein the ECU is configured to issue a control command based on the first operating status and the second operating status to transition the ADV to the safer state.

5. The method of claim 4, further comprising:
   transmitting by the first autonomous driving system a first brake command to the ECU of the ADV; and
   transmitting by the second autonomous driving system a second brake command to the ECU of the ADV, wherein the ECU is configured to issue the control command based on the first brake command and the second brake command.

6. The method of claim 5, wherein the control command is generated based on one of the first brake command and the second brake command whichever larger.

7. The method of claim 5, wherein the control command is issued in response to determining that the first operating status and the second operating status satisfying a predetermined condition.

8. The method of claim 1, wherein the first operating status comprises a processing resource usage of the first autonomous driving system and whether the first autonomous driving system is operating according to a first predetermined schedule, and wherein the second operating status comprises a processing resource usage of the second autonomous driving system and whether the second autonomous driving system is operating according to a second predetermined schedule.

9. A non-transitory machine-readable medium having instructions stored therein, which when executed by a processor, cause the processor to perform operations, the operations comprising:
   planning and controlling the ADV using a first autonomous driving system, including perceiving a driving environment surrounding the ADV and planning a trajectory to drive the ADV;
   operating a second autonomous driving system as a redundant driving system to monitor a first operating status of the first autonomous driving system;
   monitoring, by the first autonomous driving system, a second operating status of the second autonomous driving system, the monitoring including collecting operational data representing the first operating status of the first autonomous driving system and the second operating status of the second autonomous driving system stored as a data log; and
   performing a safety action to transition the ADV into a safer state based on the first and second operating statuses of the first and second autonomous driving systems.

10. The machine-readable medium of claim 9, wherein the operations further comprise:
    performing, by the first autonomous driving system, a first self-diagnosis on operations of the first autonomous driving system; and
    performing, by the second autonomous driving system, a second self-diagnosis on operations of the second autonomous driving system.

11. The machine-readable medium of claim 10, wherein the safety action is performed further based on the first self-diagnosis provided by the first autonomous driving system and the second self-diagnosis provided by the second autonomous driving system.

12. The machine-readable medium of claim 10, wherein the operations further comprise:

transmitting by the first autonomous driving system the second operating status to an electronic control unit (ECU) of the ADV; and transmitting by the second autonomous driving system the first operating status to the ECU of the ADV, wherein the ECU is configured to issue a control command based on the first operating status and the second operating status to transition the ADV to the safer state.

13. The machine-readable medium of claim 12, wherein the operations further comprise:

transmitting by the first autonomous driving system a first brake command to the ECU of the ADV; and transmitting by the second autonomous driving system a second brake command to the ECU of the ADV, wherein the ECU is configured to issue the control command based on the first brake command and the second brake command.

14. The machine-readable medium of claim 13, wherein the control command is generated based on one of the first brake command and the second brake command whichever larger.

15. The machine-readable medium of claim 13, wherein the control command is issued in response to determining that the first operating status and the second operating status satisfying a predetermined condition.

16. The machine-readable medium of claim 9, wherein the first operating status comprises a processing resource usage of the first autonomous driving system and whether the first autonomous driving system is operating according to a first predetermined schedule, and wherein the second operating status comprises a processing resource usage of the second autonomous driving system and whether the second autonomous driving system is operating according to a second predetermined schedule.

17. A method for operating an autonomous driving vehicle (ADV), the method comprising:

receiving, at an electronic control unit (ECU) of the ADV, a second operating status of a second autonomous driving system and a first control command from a first autonomous driving system;

receive, at the ECU, a first operating status of the first autonomous driving system and a second control command from the second autonomous driving system, the receiving including collecting operational data representing the first operating status of the first autonomous driving system and the second operating status of the second autonomous driving system stored as a data log, wherein the first autonomous driving system is a main system to autonomous drive the ADV and the second autonomous driving system is a backup system of the main system;

determining, by the ECU, whether the first autonomous driving system operates normally based on at least one of the first operating status or the second operating status;

executing at least one of the first control command or the second control command, in response determining that the first autonomous driving system operates normally; and performing a predetermined action to transition the ADV to a predetermined safety state, in response to determining that the first autonomous driving system operates abnormally.

18. The method of claim 17, further comprising selecting one of the first control command and the second control command for execution, in response to determining that the first autonomous driving system operates normally.

19. The method of claim 18, wherein the first and second control commands are brake commands, and wherein one of the brake commands whichever larger is selected for execution.

20. The method of claim 17, wherein the predetermined action comprises issuing a maximum brake command to the ADV attempting to stop or rapidly decelerate the ADV.

* * * * *